(12) United States Patent
Jang

(10) Patent No.: US 6,172,856 B1
(45) Date of Patent: Jan. 9, 2001

(54) MAGNETIC HEAD TRANSFERRING DEVICE WITH IMPROVED MAGNETIC HEAD UNLOCKING FOR HARD DISK DRIVES

(75) Inventor: Deok-hwan Jang, Suwon (KR)

(73) Assignee: Samsung Electronics Co., Ltd., Kyungki-Do (KR)

( * ) Notice: Under 35 U.S.C. 154(b), the term of this patent shall be extended for 0 days.

(21) Appl. No.: 09/126,593

(22) Filed: Jul. 31, 1998

(30) Foreign Application Priority Data

Dec. 30, 1997 (KR) .................................................. 97-77800

(51) Int. Cl.⁷ ........................................................ G11B 5/54
(52) U.S. Cl. ..................................... 360/256.2; 360/254.2
(58) Field of Search .................................... 360/106, 105, 360/256.2, 254.2

(56) References Cited

U.S. PATENT DOCUMENTS

| | | | |
|---|---|---|---|
| 4,047,484 | * 9/1977 | Cole | 102/76 P |
| 5,003,422 | 3/1991 | Sun et al. | 360/105 |
| 5,084,793 | * 1/1992 | Ishida et al. | 360/97.02 |
| 5,448,435 | * 9/1995 | Nakazawa et al. | 360/105 |
| 5,528,437 | * 6/1996 | Mastache | 360/105 |
| 5,568,333 | 10/1996 | Bang | 360/105 |
| 5,729,405 | * 3/1998 | Isomura et al. | 360/105 |
| 5,742,455 | * 4/1998 | Boutaghou | 360/105 |

FOREIGN PATENT DOCUMENTS 31 08 838 * 9/1982 (DE) .
55-078870 * 6/1980 (JP) .
60-147981 * 8/1985 (JP) .
7-031118 * 1/1995 (JP) .

OTHER PUBLICATIONS

Japanese Patent Abstract of 08–212729 by Ishizaki et al., Aug. 20, 1996.*

Patent Abstracts of Japan vol. 009, No. 323 (P–414), Dec. 18, 1985 & JP 60 147981 A (Mitsubishi Denki KK) Aug. 5. 1985 *Abstract.

* cited by examiner

*Primary Examiner*—Craig A. Renner
(74) *Attorney, Agent, or Firm*—Sughrue, Mion, Zinn, Macpeak & Seas, PLLC

(57) ABSTRACT

In a magnetic head transferring device of a hard disk drive, a rotor is rotatably mounted on a base and has a magnetic head for recording/reproducing information on/from the disk. A stator is installed on the base for actuating the rotor to move across a parking area and a recording area formed on the hard disk. First and second magnetic members are respectively installed at one end of the rotor and the stator and are magnetically coupled to one another when the magnetic head is positioned in the parking area of the hard disk so that the rotor is locked to not move. A pushing unit for gradually pushing the rotor by pressing in a direction such that the first and second magnetic members are separated. Thus, because the unlocking mechanism of the rotor is made slowly and smoothly by using the bimetal member, the impact and excessive rotation of the rotor during unlocking thereof can be prevented.

14 Claims, 4 Drawing Sheets

MAGNETIC HEAD TRANSFERRING DEVICE WITH IMPROVED MAGNETIC HEAD UNLOCKING FOR HARD DISK DRIVES

BACKGROUND OF THE INVENTION

1. Field of the Invention

The present invention relates to a magnetic head transferring device of a hard disk drive and, more particularly, to a magnetic head transferring device of a hard disk drive having an improved structure for unlocking a magnetic head locked in a parking area.

2. Description of the Related Art

As shown in FIG. 1, a hard disk drive is composed of a hard disk 20 rotatably installed on a base 10 for recording and reproducing information and a magnetic head transferring device for moving a magnetic head 50 to a desired track position on the hard disk 20 to record and read information. Here, the surface of the hard disk 20 is divided into a recording area 22 in which information is recorded and a parking area 21 provided at the inner portion of the hard disk 20 where the magnetic head 50 is placed when the rotation of the hard disk 20 stops.

The magnetic head transferring device has a rotor 30 installed to be capable of pivoting around a pivot shaft 34 provided on the base 10 and on which the magnetic head 50 is mounted, a stator 40 for actuating the rotor 30 to pivot by an electromagnetic force, and a locking means for locking the rotor 30 after the magnetic head 50 is placed in the parking area 21. The rotor 30 is composed of a suspension portion 31 for supporting the magnetic head 50, a swing arm 32 installed to be capable of pivoting around the pivot shaft 34 via pivot bearings 34a, and a bobbin 33 around which a coil 35 for generating an electromagnetic force is wound. The stator 40 has a magnet 41 and a yoke 42 for forming a magnetic field. Thus, as an electromagnetic force is generated due to interaction between the magnetic field generated by the magnet 41, the yoke 42, and the current flowing in the coil 35, the rotor 30 is caused to pivot in a direction according to Fleming's left-hand rule.

The locking means is composed of a damper 60 coupled to a protrusion 36 provided at an end of the bobbin 33 of the rotor 30, a first magnetic member 61 which is bonded at an end of the damper 60, and a second magnetic member 43 installed on the stator 40. When the magnetic head 50 installed at the suspension portion 31 enters the parking area 21 of the hard disk 20 as the rotor 30 is pivoted, the first and second magnetic members 61 and 43 are attracted and stick to each other by a magnetic force, as shown in FIG. 1. Thus, the rotor 30 remains in a locked state in which the first and second magnetic members 61 and 43 are stuck to each other, unless an electromagnetic force for pivoting the rotor 30 operates again.

Magnets can be used as the first and second magnetic members 61 and 43. A normal metal piece capable of being magnetized by a magnetic force can also be used for at least one of the first and second magnetic members 61 and 43. The first and second magnetic members 61 and 43 can be magnetized by a magnetic field formed by the magnet 41 and the yoke 42.

To prevent the rotor 30 from being unlocked when a strong external impact is applied, an increase in the magnetic force is required for attracting the first and second magnetic members 61 and 43. However, when a strong magnetic force is used, the unlocking of the rotor 30 is difficult.

Typically, in order to pivot the locked rotor 30 again, an electromagnetic force stronger than that of the coupling force between the first and second magnetic members 61 and 43 is applied to separate them. When the first and second magnetic members 61 and 43 are stuck to each other with a strong magnetic force, a separation force greater than the strong magnetic force, is required. When the first and second magnetic members 61 and 43 are separated by a strong separation force, the rotor 30 abruptly rotates such that the magnetic head quickly travels toward the outside edge of the hard disk, as if the rotor had received an external impact. The strong electromagnetic force continues to act on the rotor during at least part of the rotor's rotation, causing excessive rotation of the rotor. Thus, because the magnetic head 50 is moved too far out of the recording area 22 of the disk 20, extra time is required to return the magnetic head 50 to the desired position, and moreover, the magnetic head 50 may be damaged by bumping against other elements.

Therefore, a smooth unlocking of the magnetic head, in spite of the increased coupling force between the first and second magnetic members 61 and 43, is required.

SUMMARY OF THE INVENTION

To solve the above problem, it is an objective of the present invention to provide a magnetic head transferring device of a hard disk drive having an improved structure so that the rotor does not pivot excessively when unlocked although a large coupling force is used to lock the rotor.

Accordingly, to achieve the above objective, there is provided a magnetic head transferring device of a hard disk drive comprising: a rotor rotatably mounted on a base and having a magnetic head for recording/reproducing information on/from the hard disk situated near one end thereof; a stator installed on the base for actuating the rotor to move across a parking area and a recording area formed on the hard disk; first and second magnetic members respectively installed at one end of the rotor and the stator and magnetically coupled to one another when the magnetic head is positioned in the parking area of the hard disk so that the rotor is locked to not move; and a pushing unit for gradually pushing the rotor by pressing the same in a direction that the first and second magnetic members are separated during unlocking thereof.

It is preferable in the present invention that the pushing unit comprises: an electric heating plate heated by current applied from a predetermined power supply source; a bimetal member reversibly deformed by the heat transmitted from the heating plate; and a rod member having one end contacting the bimetal member and the other end contacting the rotor, for gradually pushing the rotor as the bimetal member is deformed.

BRIEF DESCRIPTION OF THE DRAWINGS

The above objective and advantages of the present invention will become more apparent by describing in detail preferred embodiments thereof with reference to the accompanying drawings, in which.

DETAILED DESCRIPTION OF THE PREFERRED EMBODIMENTS

Figure 1:
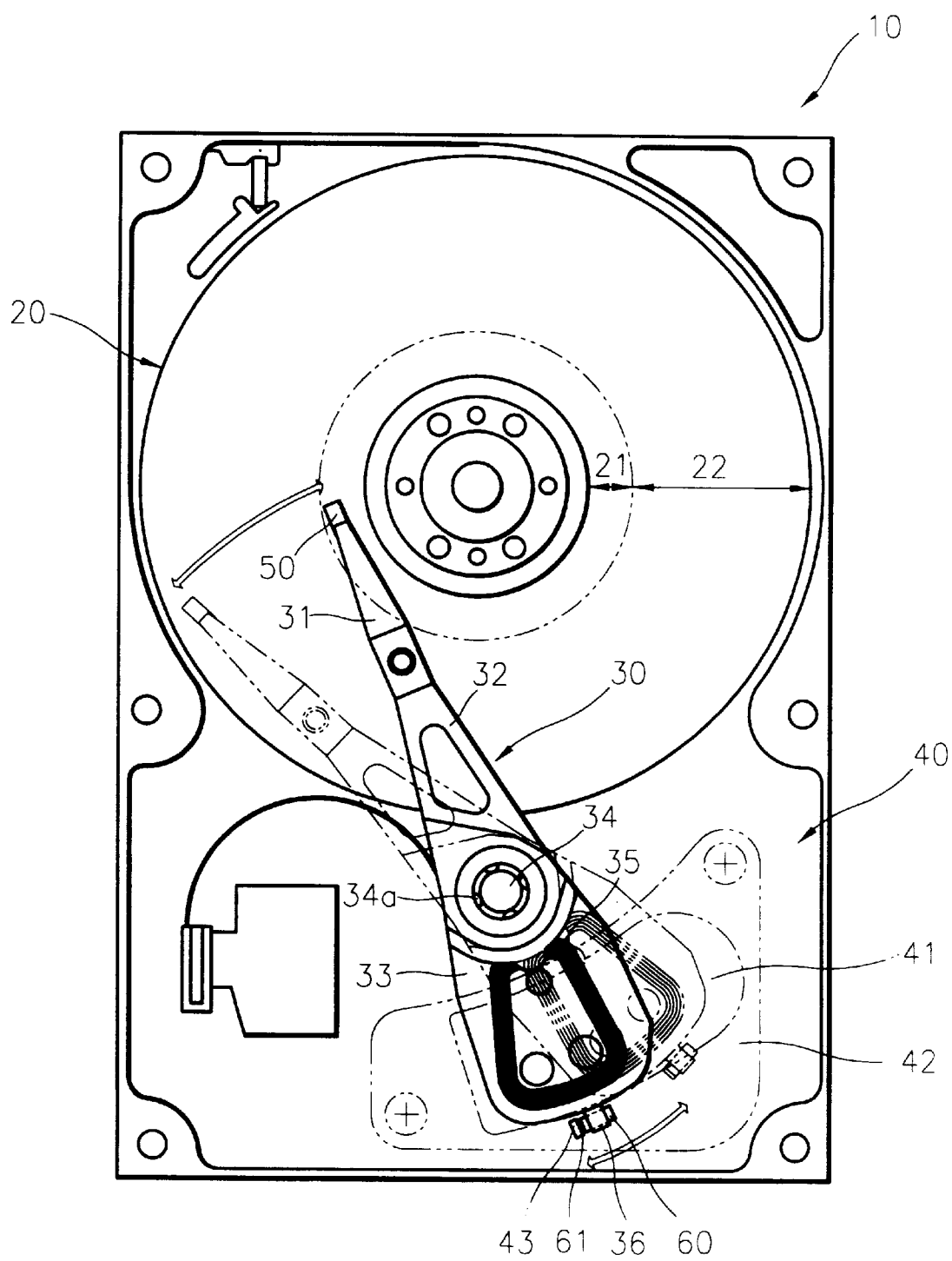
FIG. 1 is a plan view illustrating the conventional magnetic head transferring device of a hard disk drive.
Figure 2:
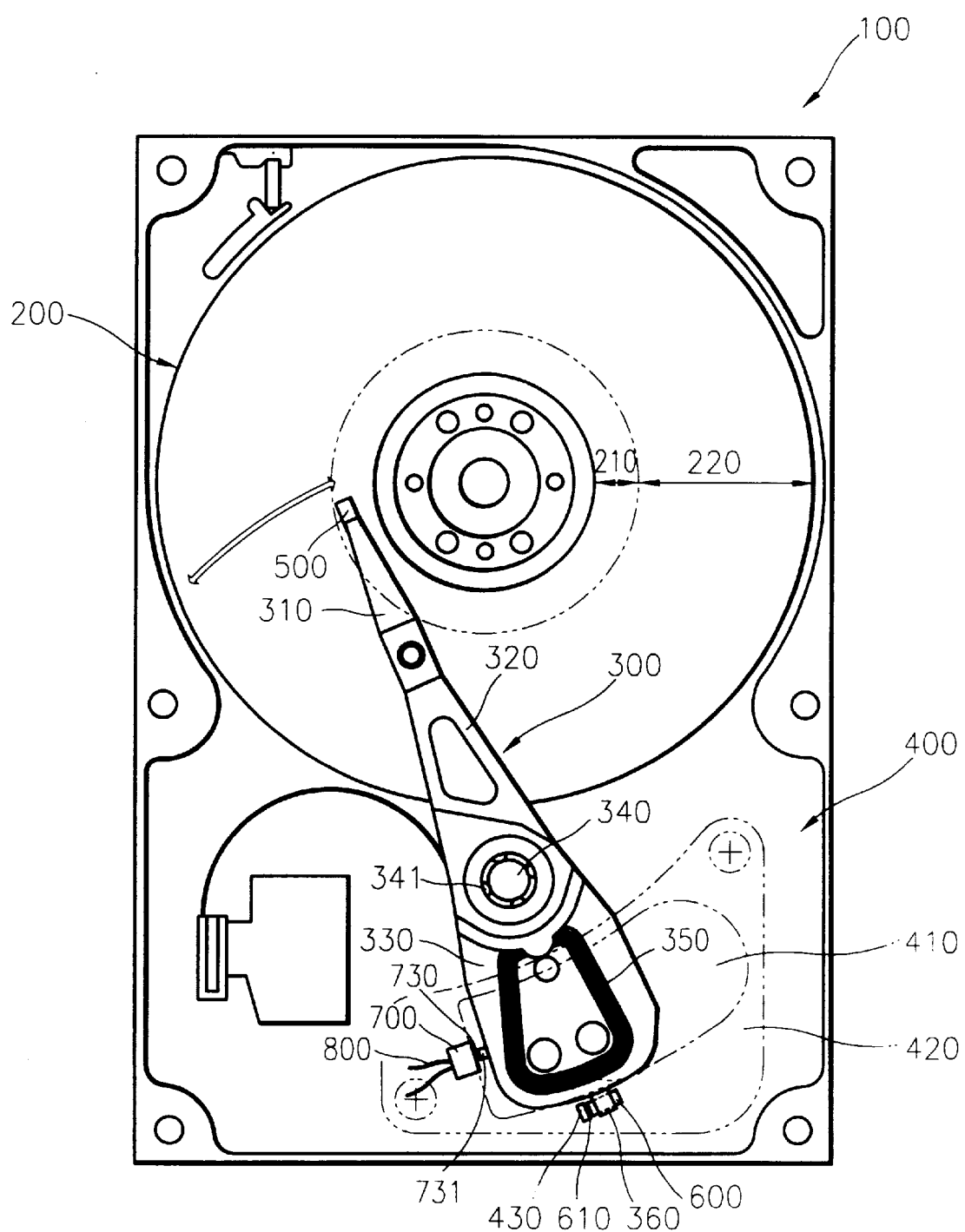
FIG. 2 is a plan view illustrating a magnetic head transferring device of a hard disk drive according to the present invention.
Figure 3:
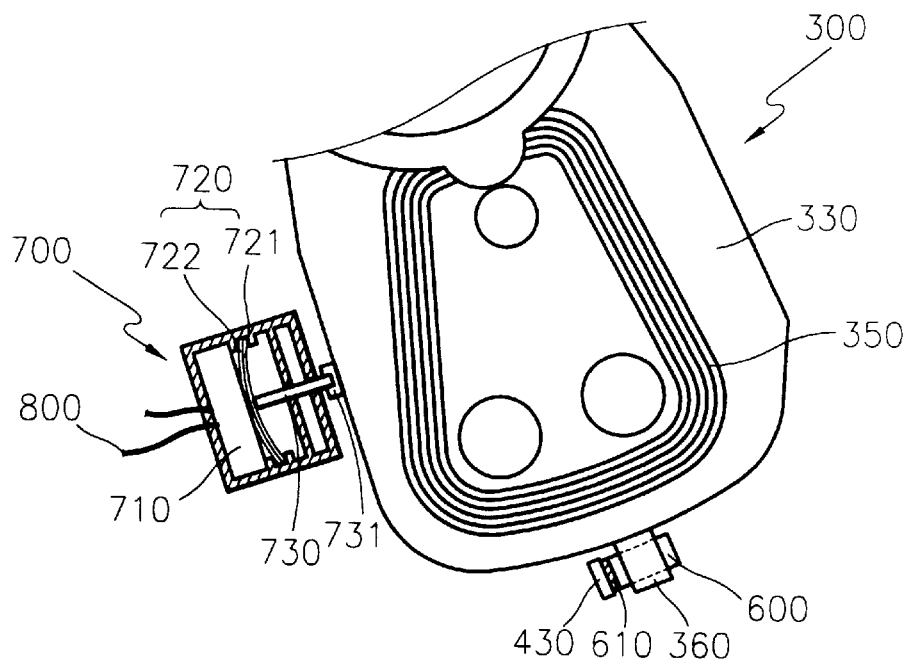
FIGS. 3 and 4 are plan views illustrating major portions of the magnetic head transferring device of a hard disk drive.
Figure 4:
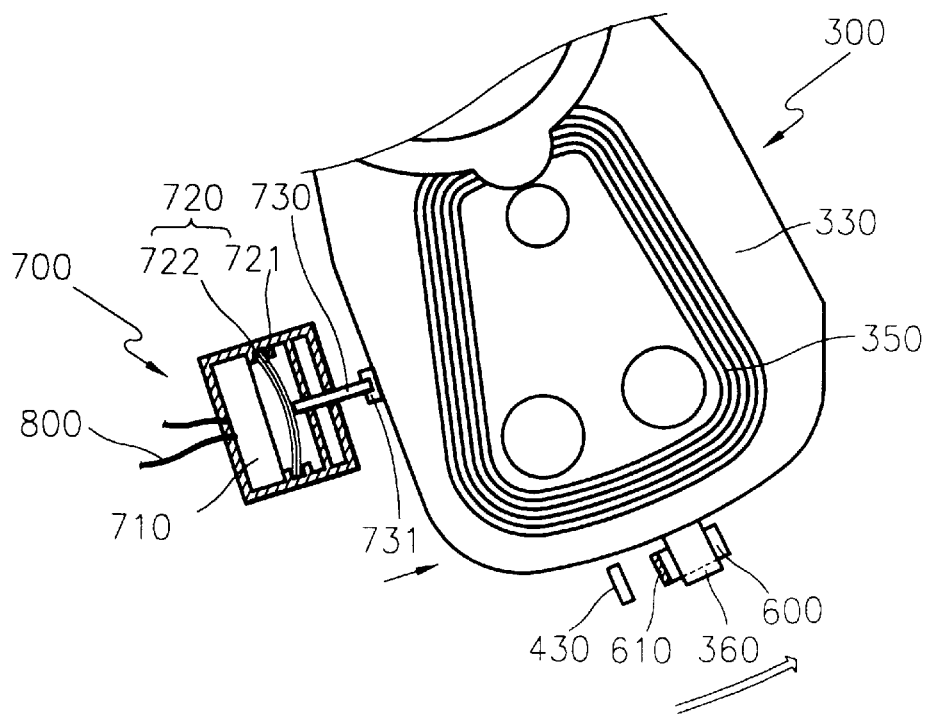

FIGS. 2 through 4 show a magnetic head of a hard disk drive according to the present invention. Referring to FIG. 2, the magnetic head of a hard disk drive according to the present invention comprises a rotor 300 rotatably installed on the base 100 where a hard disk 200 is installed and having a magnetic head 500 mounted on one end portion thereof and a stator 400 for actuating the rotor 300 to pivot across a parking area 210 and a recording area 220 formed on the hard disk 200. The rotor 300 is composed of a suspension portion 310 for supporting the magnetic head 500, a swing arm 320 rotatably installed on a pivot shaft 340 provided on the base 100, and a bobbin 330 around which a coil 350 for generating an electromagnetic force is wound. The stator 400 is composed of a magnet 410 and a yoke 420 for forming a magnetic field. Pivot bearings 341 support the rotor 300 so as to be capable of rotating around the pivot shaft 340.

In order to lock the rotor 300 when the magnetic head 500 is positioned at the parking area 210 of the hard disk 200 and unlock the locked rotor 300 as desired, there is provided a damper 600 coupled to a protrusion 360 provided at one end of the bobbin 330 of the rotor 300, a first magnetic member 610 installed at one end portion of the damper 600, a second magnetic member 430 installed at the stator 400 to enable magnetic coupling to the first magnetic member 610, and a pushing means for gradually pushing the rotor 300 in a direction that the first and second magnetic members 610 and 430 are separated. Here, at least one of the first and second magnetic members 610 and 430 is formed of a magnet and the other is formed of a material capable of sticking to the magnet. Alternatively, both the first and second magnetic members 610 and 430 can be made of a magnetizable substance, not a magnet, because the first and second magnetic members 610 and 430 can magnetically stick to each other due to the second magnetic member 430 being magnetized by the magnet 410 and the yoke 420.

As shown in FIGS. 3 and 4, the pushing means comprises an electric heating plate 710 installed inside a case 700 to be heated by receiving current from a predetermined power supply source (not shown), a bimetal member 720 to be deformed by the heat transmitted from the heating plate 710, and a rod member 730 for gradually pushing the rotor 300 as the bimetal member 720 being heated is deformed. The bimetal member 720 is composed of a metal piece 721 disposed near the rod member 730 and another metal piece 722. Here, the thermal expansion coefficient of the metal piece 721 is higher than that of the metal piece 722 so that the middle portion of the bimetal member 720 is deformed to bulge as temperature rises, as shown in FIG. 4. It is preferable that a power supply source for driving the hard disk 200 is also used as the power supply source when heating the heating plate 710. A lead line 800 supplies current to the heating plate 710.

The rod member 730, having one end in contact with the middle portion of the bimetal member 720, is pushed out of the case 700 as much as the bimetal member 720 is deformed, thereby pushing the rotor 300. A rubber buffer 731 for reducing impact and abrasion is installed at the end portion of the rod member 730 contacting the rotor 300.

In the operation of the magnetic head transferring device having the above structure, the rotor 300 pivots as power is turned off and the magnetic head 500 connected to the suspension portion 310 enters into the parking area 210 of the hard disk 200, as shown in FIG. 2. The pivoting of rotor 300 as power is turned off is well known in the art and can be performed by converting the energy inherent in the inertia of the spinning hard disk 200, to an electromagnetic force acting on the rotor 300. When the magnetic head 500 is within the parking area 210, the first magnetic member 610 coupled to the bobbin 330 sticks to the second magnetic member 430, as shown in FIG. 3. Thus, until unlocked, the locked state of the rotor 300 between the first and second magnetic members 610 and 430 due to a magnetic coupling is maintained.

When power is provided to the hard disk drive, current is supplied through the lead line 800 to the heating plate 710. Accordingly, resistance heat is generated in the heating plate 710 due to the current and the heat is transmitted to the bimetal member 720 to thermally expand the bimetal member 720. Here, because the metal piece 721 of the bimetal member 720 has a relatively higher thermal expansion coefficient than the other metal piece 722, the middle portion of the bimetal member 720 is deformed to bulge. Accordingly, the rod member 730 is pushed out of the case 700 as much as the deformed amount of the bimetal member 720. The rod member 730, through the rubber buffer 731, pushes the rotor 300. The force pushing the rotor 300 acts to separate the first and second magnetic members 610 and 430 from one another. Here, the first and second magnetic members 610 and 430 are gradually separated because the deformation of the bimetal member 720 occurs gradually according to the transmission of heat from the heating plate 710. Then, the magnetic head 500 is moved to a desired position on the hard disk 200 by an electromagnetic force which is generated due to an interaction between the magnet 410 and the yoke 420 as current is supplied to the coil 350. At this time, the current supplied to the heating plate 710 is cut off and the deformed bimetal member 710 resumes its original shape, as shown in FIG. 3. Preferably, the time required for the separation of first and second magnetic members 610 and 430 is approximately the same as the time required for the hard disk 200 to reach its rotational operating speed. Upon power being provided to the hard disk drive, a controller (not shown) provides current to the heating plate 710 through lead line 800 and delays the electromagnetic force on the rotor 300. When the hard disk 200 has reached its operational speed, the controller turns off power to the heating plate 710 and supplies current to the coil 350 to pivot the rotor 300 by electromagnetic force.

Later, as power to the hard disk drive is turned off, the magnetic head 500 moves to the parking area 210 and the first and second magnetic members 610 and 430 are again magnetically coupled to each other. As one side of the rotor 300 contacts the rubber buffer 731 of the rod member 730, the rod member 730 is pushed again inward the case 700.

Figure 5:
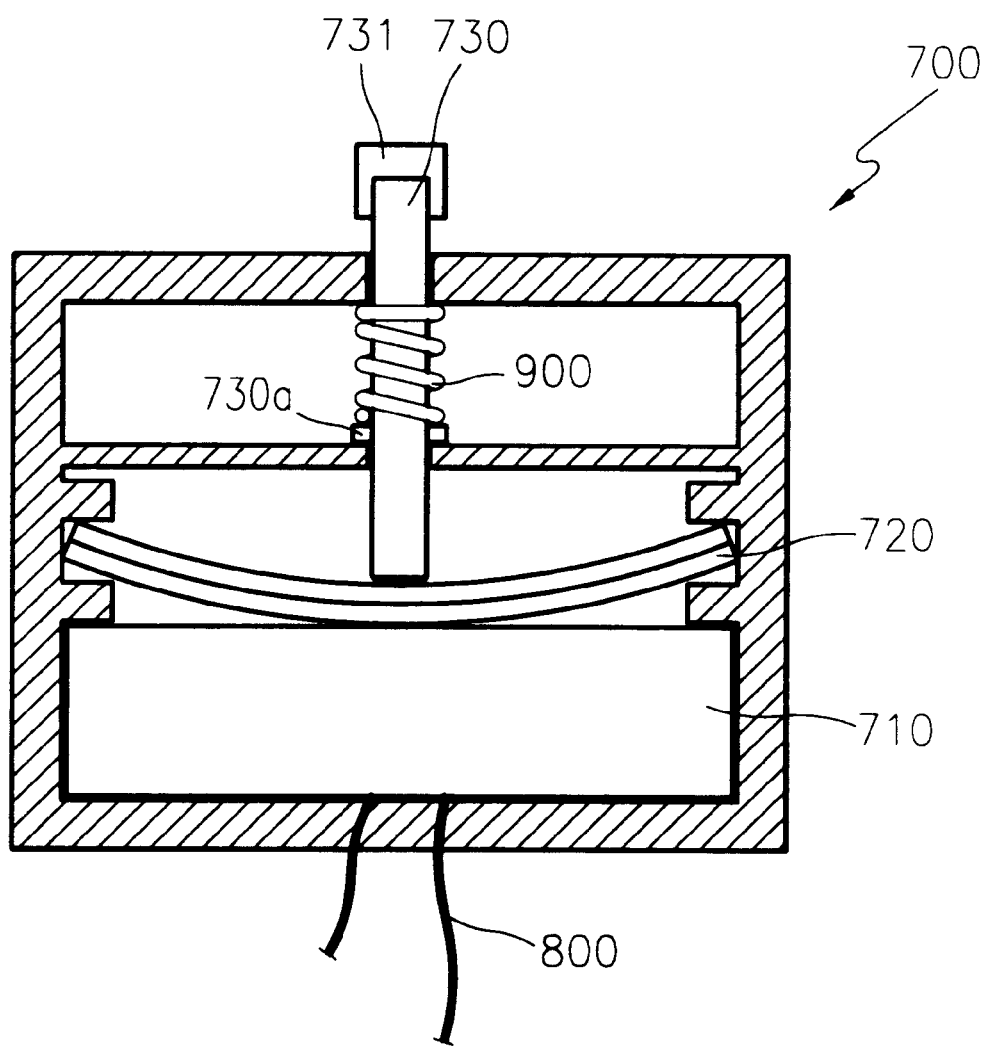
FIG. 5 is a sectional view illustrating another preferred embodiment of the present invention.

In another preferred embodiment, as shown in FIG. 5, a hooking threshold 730a is formed at the outer circumferential surface of the rod member 730 and an elastic member, e.g., a compression spring 900, is installed between the hooking threshold 730a and the inside wall of the case 700 so that the rod member 730 can instantly return to its original position as the bimetal member 720 resumes its original shape.

As described above, according to the present invention, because the unlocking mechanism of the rotor 300 is made slowly and smoothly by using the bimetal member 720, the impact and excessive rotation of the rotor 300 during unlocking thereof can be prevented. Also, because the coupling force between the first and second magnetic members 610 and 430 can be increased, the possibility of the rotor 300 becoming unlocked due to an external impact can be reduced.

It is contemplated that numerous modifications may be made to the magnetic head transferring device of the present invention without departing from the spirit and scope of the invention as defined in the following claims.

What is claimed is:

1. A magnetic head transferring device of a hard disk drive, comprising:
    a rotor rotatably installed on a base and having a magnetic head operative for recording and reading information on a hard disk;
    a stator installed on said base for actuating said rotor to move across a parking area and a recording area formed on said hard disk;
    first and second magnetic members respectively mounted on said rotor and said stator, capable of being magnetically coupled to one another such that said rotor is locked to not move; and
    a pushing unit comprising a bimetal member for gradually pushing said rotor to separate said first and second magnetic members.

2. A magnetic head transferring device of a hard disk drive, comprising:
    a rotor rotatably installed on a base and having a magnetic head operative for recording and reading information on a hard disk;
    a stator installed on said base for actuating said rotor to move across a parking area and a recording area formed on said hard disk;
    first and second magnetic members respectively mounted on said rotor and said stator, capable of being magnetically coupled to one another such that said rotor is locked to not move;
    a pushing unit for gradually pushing said rotor to separate said first and second magnetic members,
    wherein said pushing unit comprises:
        an electric heating plate;
        a bimetal member reversibly deformed by the heat transmitted from said heating plate; and
        a rod member having one end for contact with said bimetal member and the other end for contact with said rotor, for gradually pushing said rotor as said bimetal member is deformed.

3. The magnetic head transferring device as claimed in claim 2, wherein a rubber buffer is installed at the end of said rod member for contact with said rotor.

4. The magnetic head transferring device as claimed in claim 2, further comprising an elastic member for returning said rod member to an original position.

5. The magnetic head transferring device as claimed in claim 4, wherein a rubber buffer is installed at the end of said rod member for contact with said rotor.

6. A magnetic head transferring device of a hard disk drive, comprising:
    a rotor rotatably installed on a base around an axis of rotation;
    a magnetic head mounted on said rotor;
    first and second magnetic members respectively mounted on said rotor and said base, operative to magnetically engage one another; and
    a pushing unit comprising a bimetal member mounted on said base, positioned adjacent said rotor at a location away from said axis of rotation.

7. The magnetic head transferring device as claimed in claim 6, wherein said pushing unit is operative to rotate said rotor to separate said first and second magnetic members.

8. A magnetic head transferring device of a hard disk drive, comprising:
    a rotor rotatably installed on a base around an axis of rotation;
    a magnetic head mounted on said rotor;
    first and second magnetic members respectively mounted on said rotor and said base, operative to magnetically engage one another; and
    a pushing unit mounted on said base, positioned adjacent said rotor at a location away from said axis of rotation,
    wherein said pushing unit comprises:
        an electric heating plate;
        a bimetal member reversibly deformed by the heat transmitted from said heating plate; and
        a rod member having one end for contact with said bimetal member and the other end for contact with said rotor, for gradually pushing said rotor as said bimetal member is deformed.

9. The magnetic head transferring device as claimed in claim 8, wherein a rubber buffer is installed at the end of said rod member for contact with said rotor.

10. The magnetic head transferring device as claimed in claim 8, further comprising an elastic member for returning said rod member to an original position.

11. The magnetic head transferring device as claimed in claim 6, wherein a rubber buffer is installed between said pushing unit and said rotor.

12. The magnetic head transferring device as claimed in claim 6, further comprising:
    a stator, mounted in said base, capable of electromagnetically engaging said rotor.

13. A magnetic head transferring device of a hard disk drive, comprising:
    a rotor rotatably installed on a base and having a magnetic head operative for recording and reading information on a hard disk;
    a stator installed on said base for actuating said rotor to move across a parking area and a recording area formed on said hard disk;
    first and second magnetic members respectively mounted on said rotor and said stator, operative to be magnetically coupled to one another such that said rotor is locked to not move; and
    a pushing means comprising a bimetal member for gradually pushing said rotor to separate said first and second magnetic members.

14. A magnetic head transferring device of a hard disk drive, comprising:
    a rotor rotatably installed on a base and having a magnetic head operative for recording and reading information on a hard disk;
    a stator installed on said base for actuating said rotor to move across a parking area and a recording area formed on said hard disk;
    first and second magnetic members respectively mounted on said rotor and said stator, operative to be magnetically coupled to one another such that said rotor is locked to not move; and
    a pushing unit comprising a bimetal member which gradually pushes said rotor to separate said first and second magnetic members.

\* \* \* \* \*